March 29, 1960 R. E. SANCTUARY 2,930,576
BALL VALVE
Filed Oct. 31, 1957 2 Sheets-Sheet 2

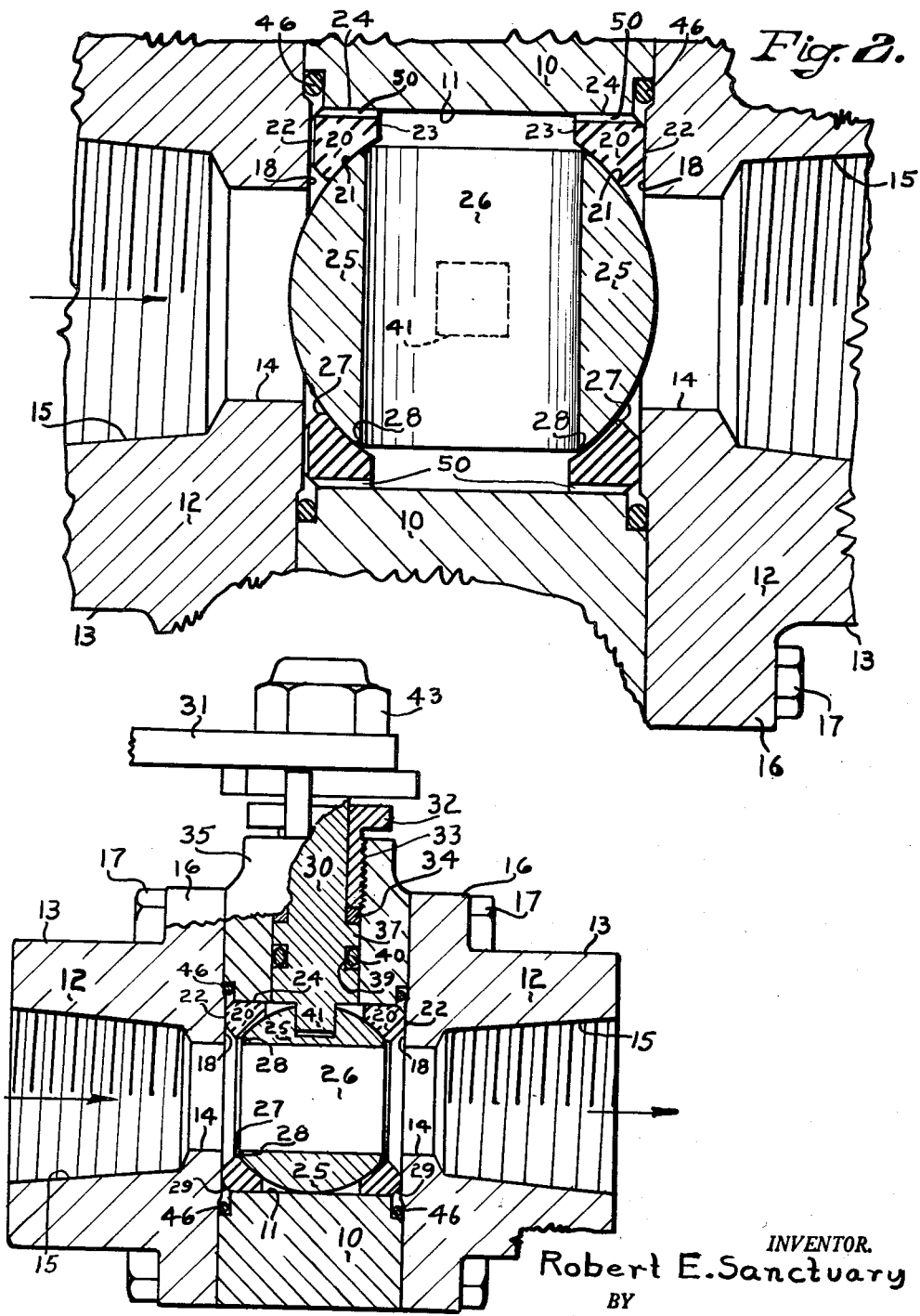

INVENTOR.
Robert E. Sanctuary
BY
Clayton L. Jenks
ATTORNEY

United States Patent Office 2,930,576
Patented Mar. 29, 1960

2,930,576

BALL VALVE

Robert E. Sanctuary, Shrewsbury, Mass., assignor to Worcester Valve Co., Inc., Worcester, Mass., a corporation of Massachusetts Application October 31, 1957, Serial No. 693,717

4 Claims. (Cl. 251—175)

This invention relates to valves, and more particularly to that type which has a ball mounted between seat rings and adapted to be rotated between positions of transmitting and stopping fluid flow.

It has been found that in a construction having a ball mounted in a cylindrical bore between up-stream and down-stream seat rings, the fluid pressure tends to distort the up-stream seat ring and to form a seal between it and the ball and valve body which hinders turning the ball from a closed to an open position. This effect is particularly pronounced where the ball valve body is a one-piece construction within the cylindrical bore, so that there is no chance of leakage between the up-stream side of the seat ring and the interior of the ball. The force on the ball, which tends to form the sealing action, is a function of the projected area of the ball on the opening in the down-stream seat ring multiplied by the differential in pressure between the down-stream and up-stream sides. I have found that the ball should not be sealed on its up-stream side but that substantially the entire sealing action should take place between the ball and the seat ring at the down-stream side, together with the associated valve body parts, and that the ball should be free from any material pressure by the up-stream seat ring.

The primary object of my invention is to provide a valve construction which prevents the formation of a seal between the up-stream seat ring and the adjacent ball and valve body surfaces, so as to eliminate a pressure differential which would distort the seat ring and hinder turning the ball. Other objects will be apparent in the following disclosure.

Referring to the drawings:

Fig. 1 is a vertical section, showing the valve ball in an open position;

Fig. 2 is a horizontal section, partly broken away, with the valve closed;

Figure 3:
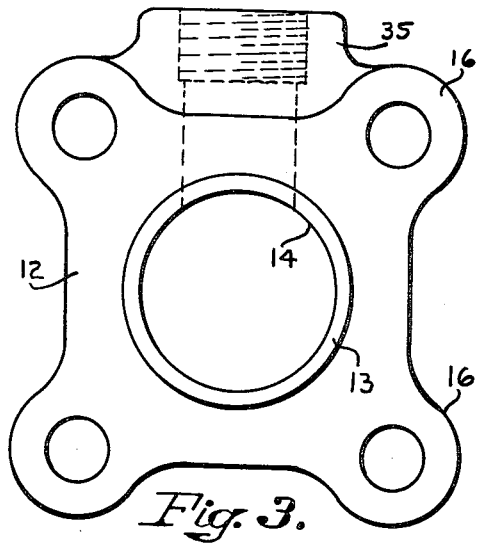
Fig. 3 is an end view of the valve body.

Referring first to Figs. 1, 2 and 3, the valve may comprise a one-piece metal body 10 having a bore therethrough providing a continuous inner cylindrical surface 11. Suitable valve ends 12 may be secured on opposite sides of the valve body by cap screws or bolts. Each valve end 12 may comprise a plate, shown as generally rectangular in shape (Fig. 3), having a boss 13 projecting centrally therefrom and bored to form a fluid passage 14 and suitable threaded pipe connections 15. The plate may have ears 16 (Fig. 3) at its four corners which have holes for bolts 17 arranged outside of or passing through the body 10 to connect the two plates 12 tightly in place against the flat ends of the valve body 10. Each valve end has a slightly raised central portion providing an inner flat circular surface 18 (Fig. 2) concentric with the bore 14. The inner bore 11 of the body is so sized that the surface 18 is exposed therein and provides a surface against which the adjacent seat ring 20 may be mounted. The outer portion of the valve end contacts the body, as shown.

The seat rings may be made of an elastomer, including a plastic or other material, such as a vulcanized rubber or a synthetic polymer, such as rubber hydrochloride or a commercial product, known as Teflon, the Du Pont trade name for a tetra fluoroethylene resin. The rings have flat surfaces 22 which are parallel with and adapted to fit tightly against the valve end faces and form a seal. Although the invention applies to many types and shapes, the ring preferably has the shape shown in the drawings. It is provided with a ball engaging surface, such as the conical or spherical face 21. It has an inner flat surface 23, preferably parallel with the flat face 22, which faces inwardly into the space 11 within the body 10. The corners of the ring next to the valve end 12 are shown as cut away at 29. Various other shapes may be employed, but in each case, the cylindrical periphery 24 of the ring makes a tight fit and seals against the inner cylindrical surface 11 of the valve body, when assembled.

The ball 25 of the valve is preferably a spherical body of metal or other suitable material having a bore 26 therethrough which is sized and arranged to communicate with the bores 14 of the valve ends through the central cylindrical openings 27 in the seat rings, so that when the valve ball is turned to an open position it provides a passage from the up-stream side to the down-stream side of the valve ends for the transmission of fluid through the valve. The bore 26 through the spherical valve forms an annulus or ring shaped structure surrounding the fluid passage, and for ease of turning the valve relative to the seat rings 20 the nose portions 28 of the ball annulus are rounded, as illustrated in Fig. 2.

The valve ball may be rotated by a cylindrical valve stem 30 operated by a suitable handle 31 (Fig. 1). This stem may have a reduced cylindrical surface rotatively mounted in a cylindrical hole through a bonnet 32 screw threaded at 33 into the internal vertical bore of a central boss 35 projecting upwardly from the valve body, this bore being at right angles to and communicating with the horizontal bore 11 within which the valve ball is mounted. The valve stem 30, which is cylindrical at its upper portion and may be suitably shaped for inter-fitting non-rotatably with the handle 31, has below the bonnet 32 a head 37 (Fig. 1), above which is a thrust washer 34 engaging the under side of the bonnet and preventing the stem from moving upwardly. The head has a groove 39 for the elastomer O-ring 40 which prevents the escape of fluid upwardly past the stem when under the compression of the high pressure fluid in the valve body. A square or rectangular lug 41 on the bottom of the valve stem fits freely into a similarly shaped recess in the top of the ball so that the ball may be rotated by the stem which preferably moves between stops, in accordance with standard construction. A nut 43 on the top of the stem 30 and other suitable provisions serve to hold the parts together for rotating the stem to turn the ball 25 of the valve from an open to a closed position. A suitable O-ring 46 (Fig. 1) is located in an annular groove in either the valve end or the body to form a fluid seal between the parts when the bolts 17 are tightened.

Figure 4:
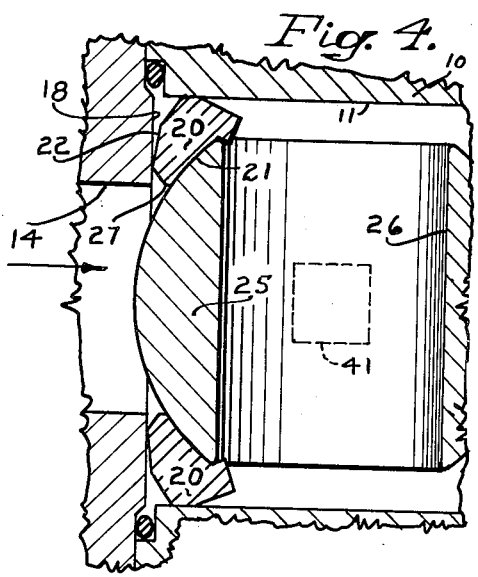
Fig. 4 is an enlarged sectional detail of a portion of the up-stream side of the valve in a closed position, showing the deformation of a standard seat ring under high fluid pressure.

The valve, as illustrated, is a two way valve in which the fluid may be admitted under pressure into either of the two valve ends. Considering the fluid pressure as being in the direction of the arrow at the left in Fig. 4, it will be observed that, when the valve is closed, the face 21 of the seat ring seals against the spherical face of the ball, but the up-stream fluid pressure escapes between the end face 22 of the ring and face 18 of the valve end and then distorts the seat ring 20 in the direction of fluid pressure, such as that shown diagrammatically in Fig. 4. This differential in the fluid pressure between the up-stream and down-stream sides of the valve ball thus forces the up-stream seat ring into a sealing engagement between the solid annulus of the ball 25 and the surface 11 of the valve body. That is, a very high fluid pressure may distort the seat ring so much that a portion of the elastomeric seat ring lies in the path of movement of the nose 28 of the ball, when it is attempted to turn and open the valve. This sealing effect on the up-stream side of the ball may render it difficult or impossible to turn the ball 25 to an open position.

To satisfy the primary object of this invention, I prevent the formation of a seal between the up-stream seat ring 20 and the adjacent ball and valve body parts by equalizing the pressure between the central cavity 11 within the valve body and the passage 14 within the up-stream valve end. This insures that the primary seal is between the down-stream seat and the adjacent faces of the ball and the valve end. This is accomplished by providing a passage between the central cavity of the valve body and the up-stream fluid passage in the valve end, which insures that the up-stream pressure is substantially equalized around the left hand seat ring (Figs. 1 and 2) so that there is no substantial seal between that ring and the ball. This transfers the pressure and insures that the major sealing effect is at the right hand side of the ball or between the ball and the down-stream seat ring and adjacent body parts.

Figure 5:
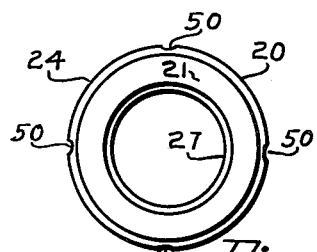
Fig. 5 is a plan of the new seat ring having pressure relieving grooves.

This passage for equalization of pressure may be provided either in the seat ring or in the valve body itself. In the form shown in Figs. 2 and 5, the seat ring 20 is provided with one or more small transverse grooves 50 (not shown in Fig. 1) in its periphery which extend throughout the full width of the seat ring from the face 22 to the opposite face 23. The fluid under pressure at the left hand side of the valve tends to move the valve ball slightly down stream or otherwise permit the fluid to escape between the face 22 of the seat ring and the vertical wall face 18 of the valve body, as shown in exaggerated form in Fig. 2 at the left, and the fluid may then flow freely through the passage 50 into the cylindrical body space 11 and the interior space 26 of the ball in its closed position. Thus the pressure on the up-stream seat ring is relieved and the pressure is transferred to the downstream seat ring, in such a manner that the ball is sealed tightly at the right against that down-stream seat ring, and the ring is forced against the wall 18 of the down-stream valve end. Although the seat rings may be duplicates and the down-stream ring has that same groove 50, yet the groove cannot admit fluid pressure behind the downstream seat ring and destroy the seal, since the fluid pressure forms a tight seal between the valve end surface 18 and the ring surface 22 as well as between the ball and the ring.

Figure 6:
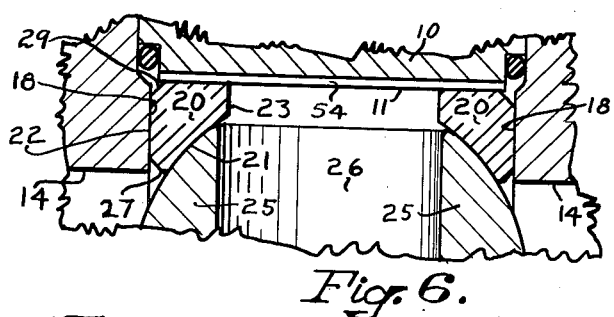
Fig. 6 is a fragmentary horizontal section showing a modification, in which the pressure relieving groove is a slot milled in the internal recess of the valve body.

The equalizing fluid pressure passage may be variously located. As shown in Fig. 6, the passage may be provided by the groove 54 suitably milled or formed in the inner cylindrical valve body face 11 to by-pass the fluid pressure around the up-stream seat ring. The effect of this groove 54 in the metal body is thus the same as that of the grove 50 (Fig. 3) in the seat ring.

Figure 8:
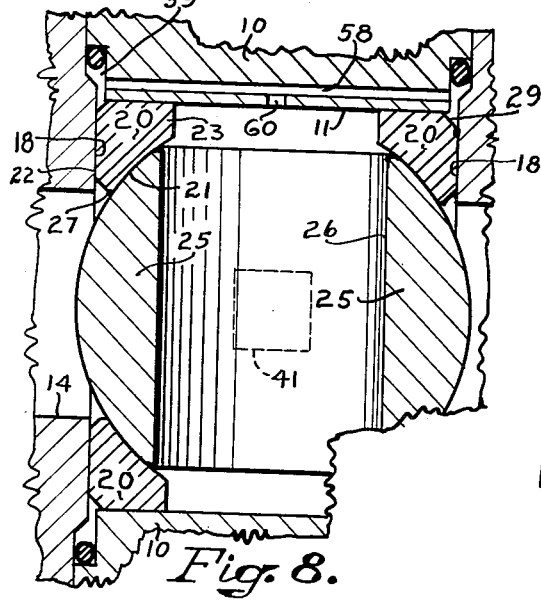
Fig. 8 shows another modification having a drilled passage in the valve body which by-passes the seat rings.
Figure 7:
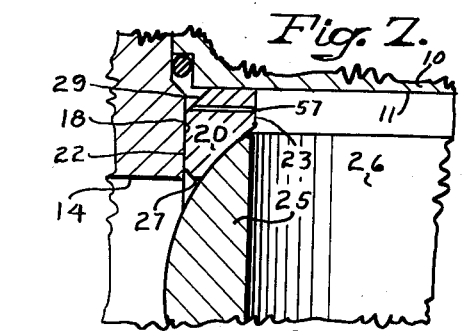
Fig. 7 is a similar view of another modification showing a seat ring provided with a drilled hole therethrough.

This equalizing passage may also be formed by a hole 57 bored through the seat ring, as illustrated in Fig. 7, which provides the same communication between the opposite sides of the ring. Also, a hole 58, as shown in Fig. 8, may be drilled in a suitable location through the metal body 10 between a shallow recess 59 cut in the face of the wall of either the valve end 12 or the body 10. A hole 60 connects the hole 58 with the inside of the valve body. This passage thus connects the up-stream side of the seat ring with the central space within the valve body. These bores may be located in the body below and opposite the valve stem passage. Various other structural means may be adopted to provide this pressure equalizing passage between the body cavity and the up-stream valve pipe end, which prevents the formation of a seal between the up-stream seat ring and the adjacent surfaces of the ring and body. Thus, the pressure differential between the up- and down-stream sides of the up-stream ring is eliminated or transferred to the down-stream ring and there can be no distortion of a seat ring to hinder turning the ball. Under this equalized pressure condition, the up-stream seat ring floats substantially freely, in that the fluid pressure thereagainst cannot provide any material seal between it and the adjacent ball and body parts. It will, of course, be understood that this pressure equalization passage between the center of the valve and the up-stream side is so located as not to interfere with the down-stream seal or the operation of the seat rings. This pressure equalization passage makes it possible to turn the ball valve readily from a closed to an open position, even when very high fluid pressures are employed. Other advantages will be readily apparent.

It will also be appreciated that the valve ends may be made integral with the valve body, or that the surfaces against which the seat rings lie may be surfaces on flanges on the valve body or other suitable constructional features. That is, the valve ends in accordance with this invention may be considered as a part of the valve body and as providing seating surfaces against which the outer faces of the seat rings make seating contact. Also, the shapes of the internal surface 11 of the valve body and the outer peripheral surface of each seat ring are such as to make a substantially interfitting contact, so that the rings are accurately located in the fluid passage provided by the surface 11, whether the latter is cylindrical or otherwise shaped, and the rings are positioned accurately relative to the surface of the rotatable ball. In this construction the seating surface of the ring against the ball and its rear seating surface against the wall 18 are essential to the stoppage of the fluid flow when the ball is turned to the position of Fig. 2.

It will be appreciated that this invention applies to various two way ball valve constructions and that many modifications may be made within the scope of the appended claims.

I claim:

1. A valve comprising a hollow body, the inner space of which has at its opposite sides two continuous cylindrical surface portions, annular walls forming parallel seat ring retaining surfaces normal and adjacent to said surface portions and having openings therethrough defining upstream and downstream passages, a freely floating annular valve ball having part spherical faces and a fluid passage therebetween which is located in said space and is turnable to open and closed positions relative to said passages, means including a valve stem to turn the ball for any floating position thereof, a pair of distortable elastomeric seat rings of uniform composition on the opposite upstream and downstream sides of the ball and floatable downstream therewith, each ring having an outer flat face sealing against one of said parallel surfaces when on the downstream side, an inner face yieldingly engaging the ball and a cylindrical peripheral face substantially sealing against one of said cylindrical surface portions, said body space providing clearance for downstream movement and rotation of the ball and distortion of the upstream seat ring, said valve having a pressure equalization passage leading directly around said cylindrical surface portion from the outer face to the inner side of the upstream ring and to said inner space of the valve body, the fluid under pressure serving to move the upstream ring with the floating ball to seat the ball against the downstream ring and to provide space adjacent the outer face of the upstream ring communicating with the equalization passage and thereby equalize the pressure between the upstream fluid passage, said inner space and both the inner and outer sides of the upstream ring and prevent distortion of the ring and minimize the friction between it and the ball and the transmission of pressure from the upstream ring to the downstream ring, so that the torque involved in the stem turning the valve ball is opposed substantially only by the friction of the ball against the downstream ring.

2. A seat ring according to claim 1 in which the ring has at least one groove in its peripheral face extending between its outer and inner faces which provides the pressure equalizing passage and serves to equalize the pressure between the interior of the ball and the upstream fluid.

3. In combination with a ball valve, a ball valve seat ring comprising an annular body of elastomeric material having an axial fluid passage therethrough, an outer cylindrical peripheral wall, a rear face perpendicular to the axis of the fluid passage, and a front face shaped to make a continuous sealing contact with a ball, said ring having at least one auxiliary axial passage therein for transmitting fluid pressure completely between the rear face and the front face.

4. A ball valve according to claim 3 in which the auxiliary fluid passage comprises a transverse groove in the peripheral wall of the seat ring which extends from the rear face to the front of the ring.

References Cited in the file of this patent

UNITED STATES PATENTS

| | | |
|---|---|---|
| Re. 24,102 | Ohls | Dec. 13, 1955 |
| 2,201,895 | Glen | May 21, 1940 |
| 2,547,831 | Mueller | Apr. 3, 1951 |
| 2,606,740 | Allen | Aug. 12, 1952 |
| 2,762,601 | Clade | Sept. 11, 1956 |
| 2,839,266 | Kaiser | June 17, 1958 |
| 2,855,177 | Freeman | Oct. 7, 1958 |

FOREIGN PATENTS

| | | |
|---|---|---|
| 759,218 | Great Britain | Oct. 17, 1956 |